United States Patent [19]
Nielson

[11] 3,939,999
[45] Feb. 24, 1976

[54] FORKLIFT HAND TRUCK

[75] Inventor: Edsel J. Nielson, Woods Cross, Utah

[73] Assignee: The United States of America as represented by the Secretary of the Air Force, Washington, D.C.

[22] Filed: Nov. 20, 1974

[21] Appl. No.: 525,595

[52] U.S. Cl.............................. 214/370; 280/47.27
[51] Int. Cl.² ........................................... B62B 1/06
[58] Field of Search .......................... 214/370–384; 280/47.28, 47.27, 47.29, 150 D, 47.24

[56] References Cited
UNITED STATES PATENTS

| | | | |
|---|---|---|---|
| 673,690 | 5/1901 | Schoelch...................... | 280/47.29 X |
| 1,431,861 | 10/1922 | Adams............................. | 214/375 |
| 2,477,294 | 7/1949 | Fuller................. | 214/374 |
| 2,800,337 | 7/1957 | Avril........................... | 280/47.29 X |

*Primary Examiner*—Albert J. Makay
*Attorney, Agent, or Firm*—Joseph E. Rusz; Arsen Tashjian

[57] ABSTRACT

A hand operated forklift truck including a swivel wheel assembly attached to the lowermost portion of a brace extending downwardly from the side rails and a load support comprising an angularly adjustable mast pivotally attached to the lower ends of the side rails with a pair of forks extending outwardly such that heavy loads can be lifted and balanced while being moved while the swivel wheel adds to the stability of the load.

1 Claim, 2 Drawing Figures

FORKLIFT HAND TRUCK

STATEMENT OF GOVERNMENT INTEREST

The invention described herein may be manufactured and used by or for the Government for governmental purposes without the payment of any royalty thereon.

BACKGROUND OF THE INVENTION

This invention relates to a hand operated forklift truck and more particularly, the invention is concerned with providing a hand truck which includes an angularly adjustable mast pivotally attached thereto with forward projecting forks for lifting the workload and a swivel third wheel positioned for rolling contact with the ground surface after the workpiece is loaded. Leverage can be varied as required by adjusting the length of the handles.

Heretofore, in the moving and transporting of heavy and bulky material into and around a warehouse or storage area, it has been customary to use a powered forklift truck. Most times the material is moved from one location on the floor to a loading platform or to another position. It is well known that powered forklift trucks are expensive to buy and operate and require substantially constant maintenance by skilled personnel. Also, powered vehicles contribute to pollution in the atmosphere and require ventilation with corresponding loss of heat and energy.

It has been estimated that up to seventy five per cent of the work of a powered vehicle can be successfully done by a properly designed hand operated forklift truck. Additionally, the hand operated truck would be capable of operation in closed-in areas thereby helping to eliminate existing space problems by functioning in areas which are too small or inaccessible to motorized forklifts. It can be seen that the hereinafter described hand operated forklift truck which is a relatively simple unit and requires only an average size man to operate, will overcome the shortcomings of the powered forklift while at the same time performing a great number of the jobs that normally require a powered forklift to complete.

SUMMARY OF THE INVENTION

The present invention is concerned with providing a forklift hand truck for use in lifting and transporting heavy and bulky items such as refrigerators, washers, stoves, dryers, air conditioners and the like, as well as 55 gallon drums, both empty and filled with liquid. The hand truck includes a forward load support with a mast section angularly adjustable and two forks extending forwardly therefrom for lifting the workload. A swivel type third wheel is positioned back of the two main wheels so that the truck can be easily maneuvered whether loaded or empty. Extension handles are provided so that heavier items can be more easily tilted back into handling position.

Accordingly, it is an object of the invention to provide a hand operated forklift truck which is very easy to manipulate and requires little or no expense for upkeep.

Another object of the invention is to provide a forklift hand truck including two forwardly projecting forks which can be positioned at various widths according to the item being handled.

Still another object of the invention is to provide a leverage lift hand truck which includes extension handles that can be extended or shortened as required making heavier items easier to tilt back into handling position.

A further object of the invention is to provide a forklift hand truck having a third wheel, swivel type, set back of the two main wheels, making it extremely easy to maneuver, loaded or empty.

A still further object of the invention is to provide a leverage lift hand truck which includes an extension mast that can be angularly raised and lowered relative to the rails of the hand truck according to the height of the item being handled.

Another still further object of the invention is to provide a forklift hand truck having weights on the frame thereof which can be installed and removed with great ease and speed thereby making the lifting and balancing of materials easier.

These and other objects, features and advantages will become more apparent after considering the following description taken in conjunction with the annexed drawings and appended claims.

DESCRIPTION OF THE PREFERRED EMBODIMENT

Figure 1:
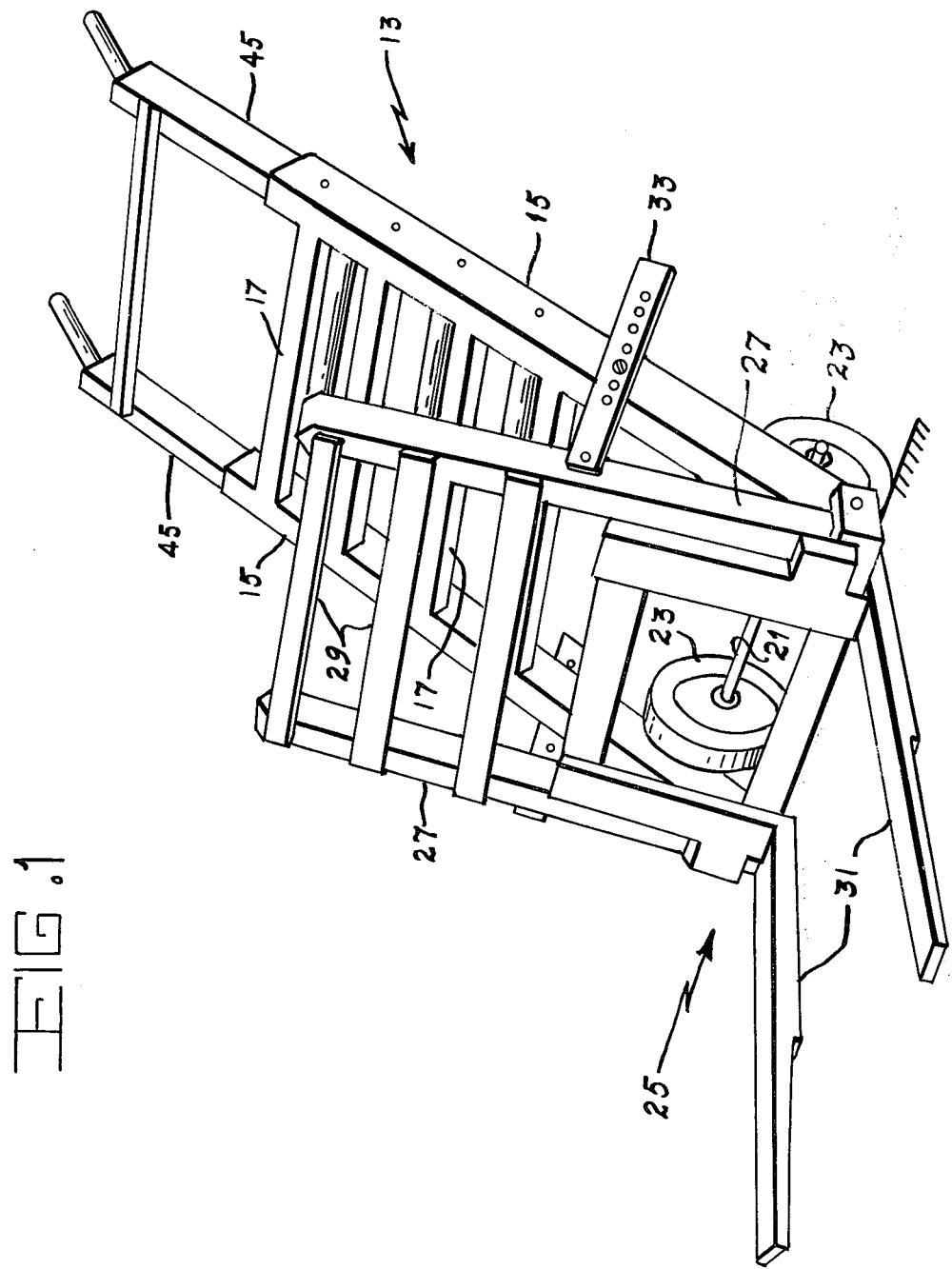
FIG. 1 is a view in perspective of a forklift hand truck according to the invention showing the angularly adjustable mast and forks with the swivel third wheel removed.

Referring now to the drawings, the hand operated forklift truck of this invention includes a handle unit generally designated by the reference numeral 13 and comprises a pair of spaced side rails 15 with a plurality of spacer elements 17 which support and maintain the side rails 15 in spaced parallel relationship. At the lower end of each of the spaced side rails 15 there is positioned a suitable axle bracket assembly 19 which support the transverse axle shaft 21. The wheels 23 are installed to rotate on the axle shaft 21 and together therewith comprise the axle assembly.

Pivotally attached to the lower ends of the rails 15 is a load support generally designated by the numeral 25 and includes a mast section comprising a pair of spaced rails 27 with supporting cross members 29 and adjustable forks 31 projecting forwardly to lift and support the work load. A pair of mast supports 33 are pivotally attached between the sides of the mast rails 27 and the side rails 15 for adjusting the angle of the mast section relative to the handle unit 13. It can be seen that the position of the mast supports 33 effectively determines the angle of the main handles 13 relative to the workload when the hand truck is in lifting position and that by proper adjustment heavy and bulky loads can be easily handled by an average sized person.

Figure 2:
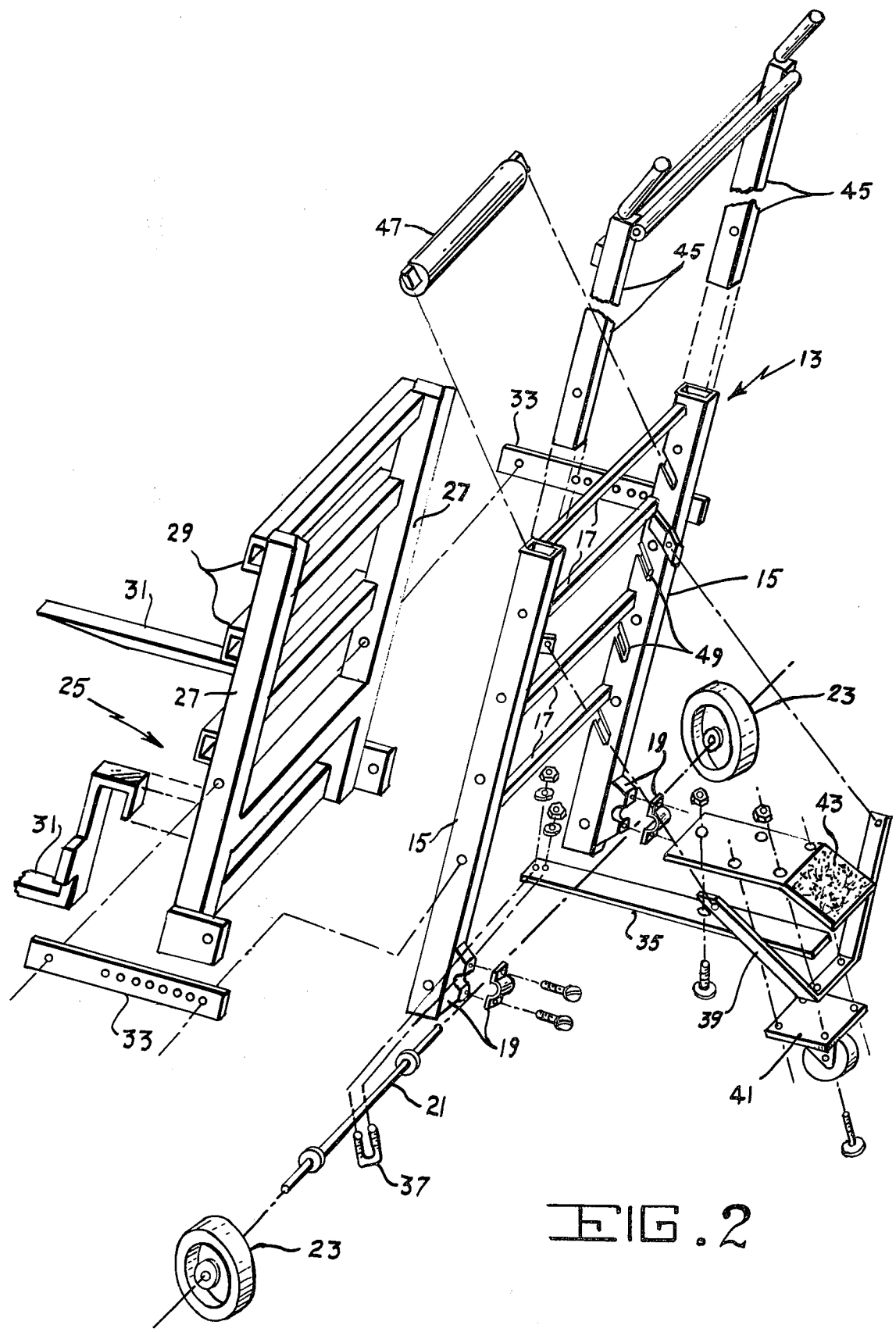
FIG. 2 is an exploded view of the hand truck showing the detail of the various elements of the invention in their positions relative to each other.

Attached to and extending rearwardly from the axle shaft 21, there is positioned a reach 35 shown in FIG. 2. A U-bolt 37 serves to connect the forward end of the reach 35 to the axle shaft 21. A V-shaped brace 39 extends downwardly from the rails 15 on the handle unit 13 to the rearward end of the reach 35 to provide a support for a swivel wheel assembly 41. A foot pedal 43 is also positioned at the junction of the reach 35 and brace 39 above the swivel wheel 41 and works to aid in lifting and balancing the workload during operation of the forklift hand truck.

The handle unit 13 is provided with extensions 45 which effectively operate to lengthen the side rails 15 to give added leverage when unusually heavy or bulky material is being transported. Various weights 47 can be installed and removed from the handle unit 13 by positioning in slots 49 on the inner walls of the side rails 15. These weights 47 make lifting and balancing of the workload easier.

It should be noted that the hereinbefore described forklift hand truck can be disassembled or reassembled very quickly and that the unit has excellent balance, whether loaded or empty, when fully assembled. Also, the leverage lift will work efficiently in small and large areas with low ceilings and allows a person small in stature to move large and bulky items easily with little stress or strain. Thus, while it is simple to operate, the forklift hand truck will perform the duties of a powered forklift without the accompanying expenses for upkeep and maintenance.

Although the invention has been illustrated in the accompanying drawings and described in the foregoing specification in terms of a preferred embodiment thereof, the invention is not limited to this embodiment or to the preferred configuration mentioned. It will be apparent to those skilled in the art that my invention could have extensive use in warehouses where there is always a backlog of material or empty crates to be moved. Because of the low cost of the leverage lift, one or more could be placed in several work areas, ready and available to keep the material moving thereby relieving the workload of the powered lifts that are more costly as well as more hazardous to operate.

Also, it should be understood that various changes, alterations, modifications and substitutions, particularly with respect to the construction details, can be made in the arrangement of the several elements without departing from the true spirit and scope of the appended claims.

Having thus described my invention, what I claim and desire to secure by Letters Patent of the United States is:

1. In a tiltable hand truck having a main frame which includes side rails and handles at the rearward end thereof and carrying wheels with axle therefor at the forward ends, the improvement comprising extensions fitted into said side rails for extending the length thereof, the handles being attached to the rearward end of said extensions, a series of angular slots on the inner walls of said side rails, a corresponding series of counter weights insertable in said slots for counter balancing the work load, a V-shaped brace attached to said side rails and extending downwardly therefrom, a reach member extending rearward from said axle to said brace, a swivel wheel assembly attached to the lowermost portion of said brace for rolling contact with the ground surface, an angularly adjustable load support including a mast pivotally attached to the side rails at the forward end of said main frame and extending upwardly therefrom, a pair of adjustable mast supports pivotally attached between the sides of said mast and the side rails of the main frame, and a pair of forks extending outwardly from the lower end of said mast for insertion under a workload whereby the angle of said load support relative to the hand truck can be varied to obtain the maximum work advantage depending on the size, shape and weight of the workload.

* * * * *

UNITED STATES PATENT OFFICE
CERTIFICATE OF CORRECTION

PATENT NO. : 3,939,999
DATED : Feb. 24, 1976
INVENTOR(S) : Edsel J. Nielson

It is certified that error appears in the above-identified patent and that said Letters Patent are hereby corrected as shown below:

Cover sheet, delete "[73] Assignee: The United States of America as represented by the Secretary of the Air Force, Washington, D.C."

Signed and Sealed this twenty-fifth Day of May 1976

[SEAL]

Attest:

RUTH C. MASON
Attesting Officer

C. MARSHALL DANN
Commissioner of Patents and Trademarks